Nov. 22, 1949  J. A. W. MADSEN  2,488,673
CHUCK
Filed Aug. 12, 1946  5 Sheets-Sheet 1
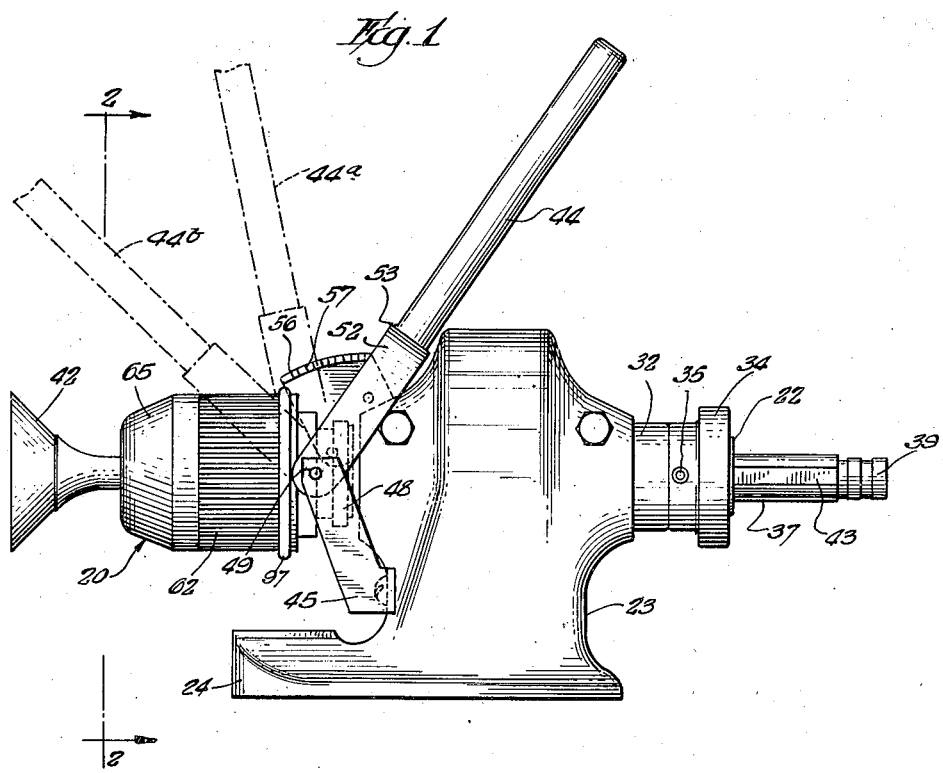

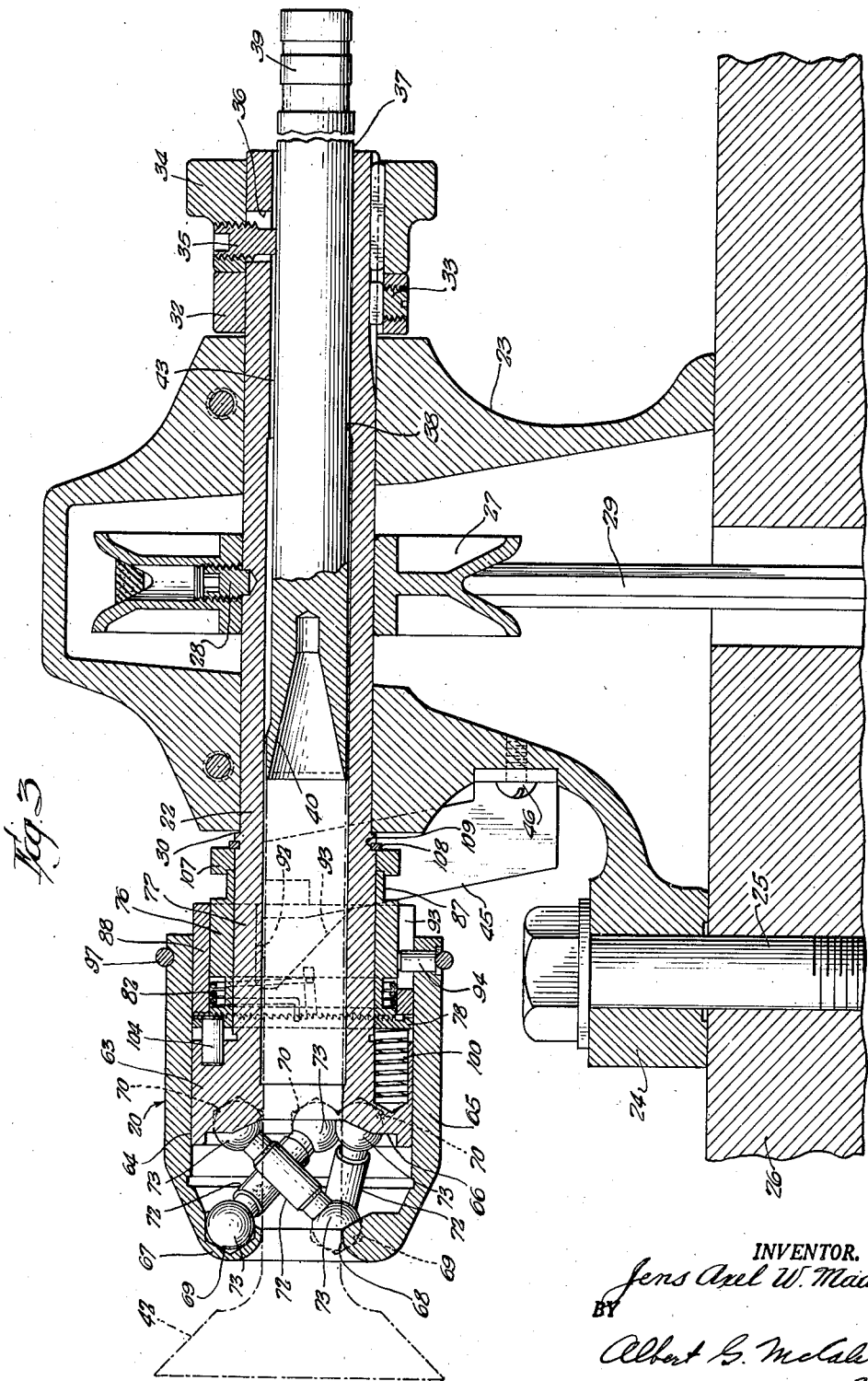

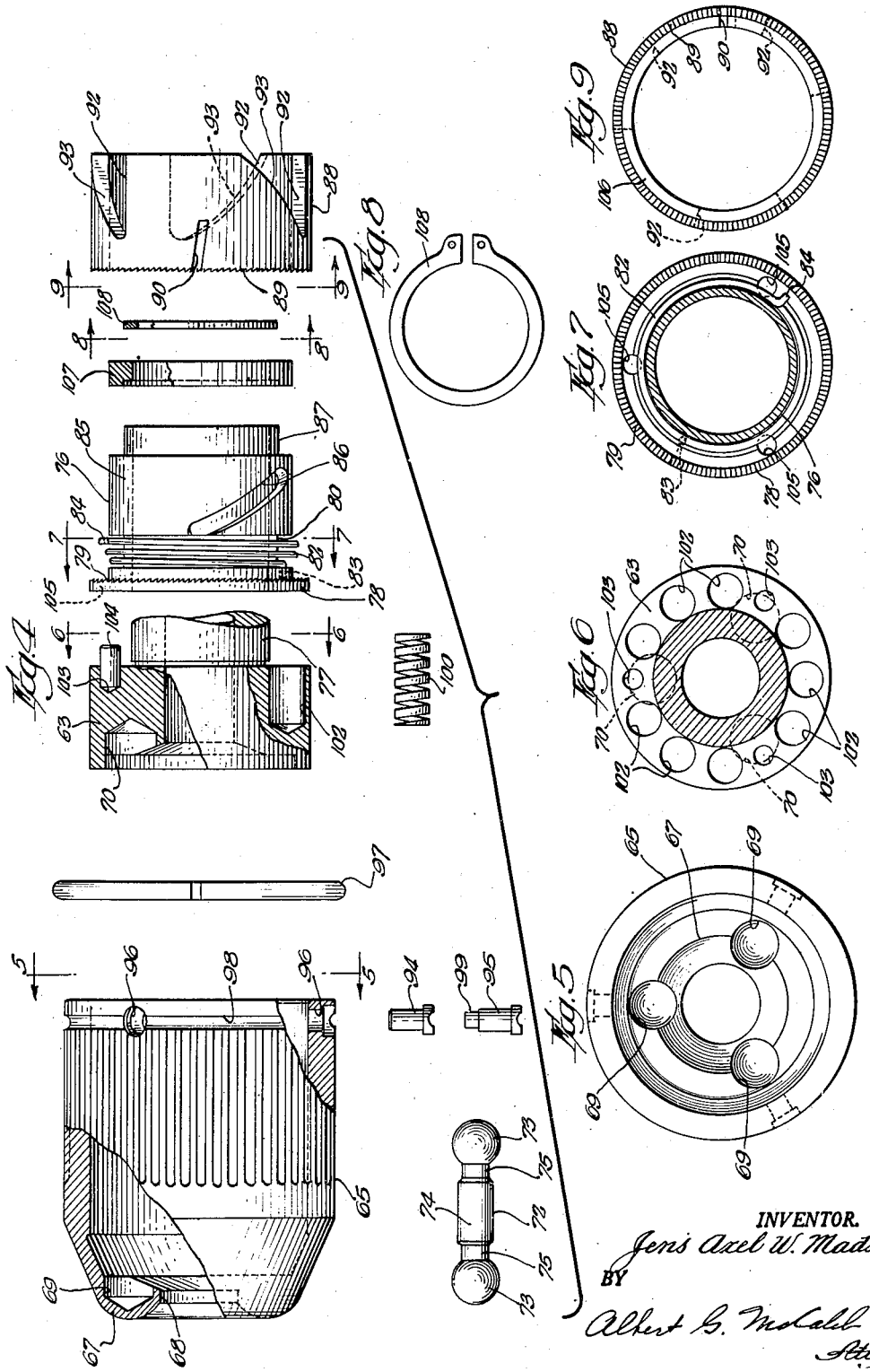

Nov. 22, 1949 J. A. W. MADSEN 2,488,673
CHUCK
Filed Aug. 12, 1946 5 Sheets-Sheet 4
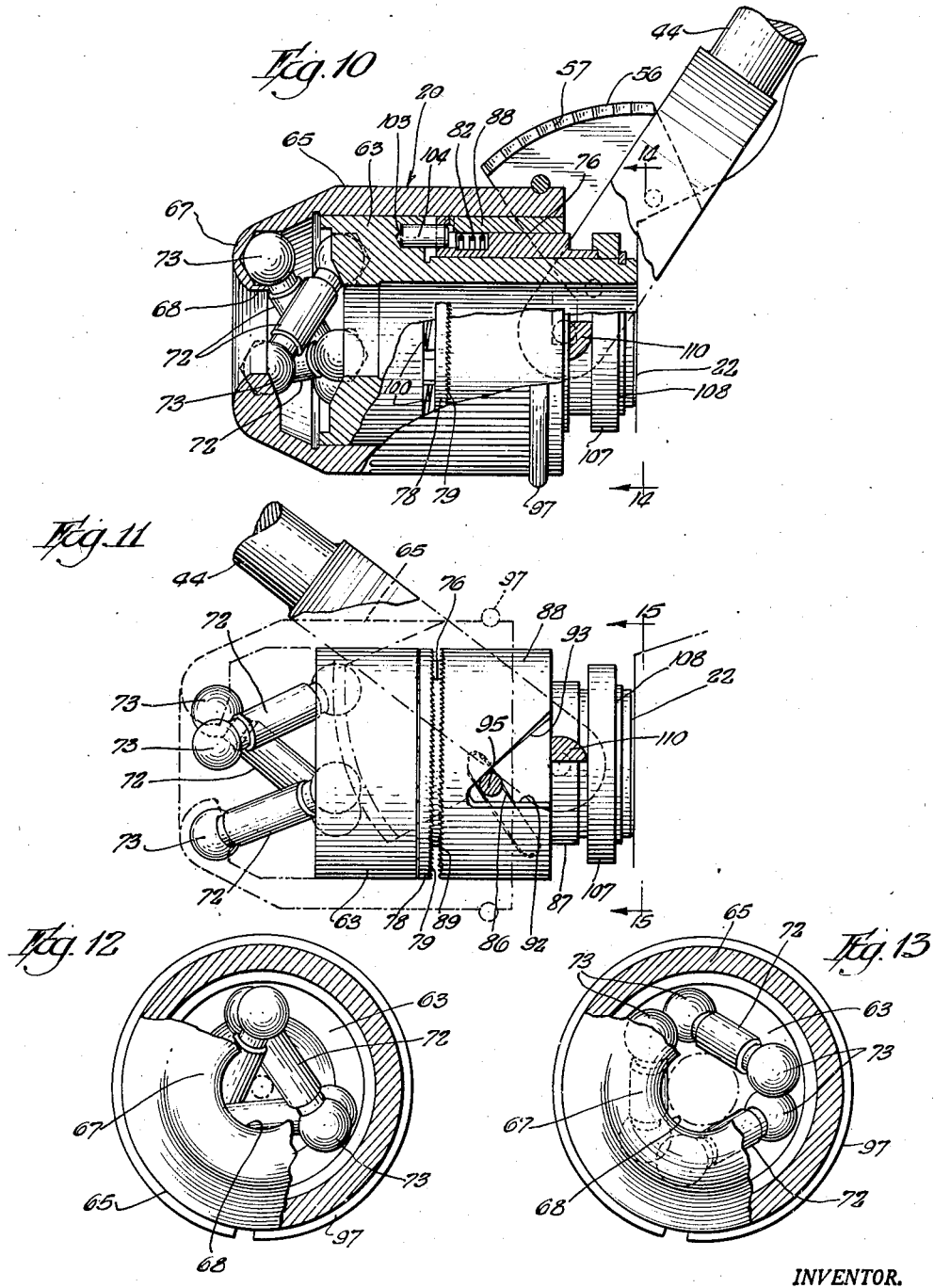
INVENTOR.
Jens Axel W. Madsen
BY
Albert G. McCaleb
Atty.

Nov. 22, 1949   J. A. W. MADSEN   2,488,673
CHUCK

Filed Aug. 12, 1946   5 Sheets-Sheet 5

INVENTOR.
Jens Axel W. Madsen
BY
Albert G. McCaleb
Atty.

Patented Nov. 22, 1949

2,488,673

UNITED STATES PATENT OFFICE 2,488,673

CHUCK

Jens Axel W. Madsen, Sioux City, Iowa, assignor to Albertson & Company, Inc., Sioux City, Iowa, a corporation of Iowa Application August 12, 1946, Serial No. 690,023

17 Claims. (Cl. 279—55)

This invention relates to chucks and particularly to those of a type adapted to grip articles of any size within a considerable range and which normally centers the gripped article while it is held.

One of the more general objects of my present invention is to provide a chuck having a relatively wide range of movement of the gripping elements, which movement may be readily and quickly effected by comparatively small movements of a chuck-operating member.

Another of the more general objects of my invention is to provide a chuck in which the gripping elements are normally biased toward their gripping positions, and although the gripping force is relatively large, the gripping elements may be quickly and easily actuated to a position of release by manual force applied to, and comparatively small movement of, an operating member.

My invention has for a further object the provision of a chuck embodying a plurality of substantially rigid gripping elements symmetrically disposed with respect to an axis and supported by carrying parts which are relatively movable rotationally and linearly to effect complex and similar movements of the gripping elements toward and from the said axis.

As another object my invention contemplates the provision in a chuck of the type described in the preceding object of means for connecting the carrying parts so that the relative rotational and linear movements thereof are proportional.

It is also an object of this invention to provide a chuck in which the gripping elements are biased toward a gripping position and wherein the biasing force utilized for moving the gripping elements into contact with a part to be gripped or which opposes movement of the gripping elements away from said part is considerably less than the biasing force which produces the gripping action of the gripping elements.

For a further object, my present invention comprehends the provision of a chuck suitable for production uses in which the time consumed in the placement of parts therein and the removal of parts therefrom is to be minimized, and which chuck will accommodate parts of varying diameters or parts of different sizes.

Other objects and advantages of the invention will be apparent from the following description and the accompanying drawings, in which similar characters of reference indicate similar parts throughout the several views.

In the five sheets of drawings,

Fig. 1 is a side elevational view depicting one adaptation of a preferred form of my present invention;

Fig. 2 is a front elevational view of the apparatus illustrated in Fig. 1 and is taken from a position substantially on a line 2—2 of Fig. 1 and in the direction indicated by the arrows;

Fig. 3 is a side sectional view of a portion of the apparatus disclosed in Figs. 1 and 2, drawn to a somewhat larger scale and illustrating the mounting of the apparatus;

Fig. 4 is an exploded view showing the parts of a preferred form of my chuck in side elevation and indicating their positions in the assembly;

Figure 14:
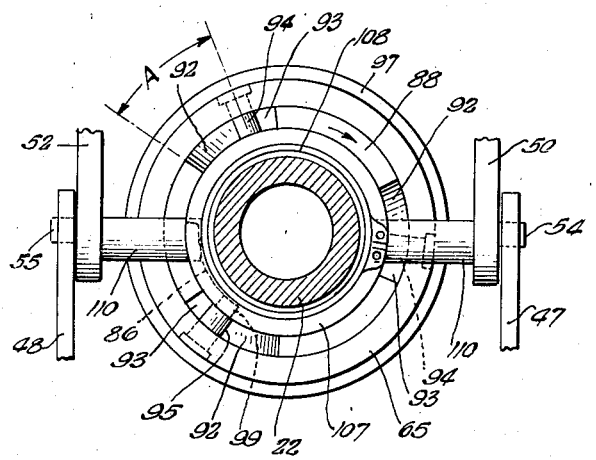
Figure 15:
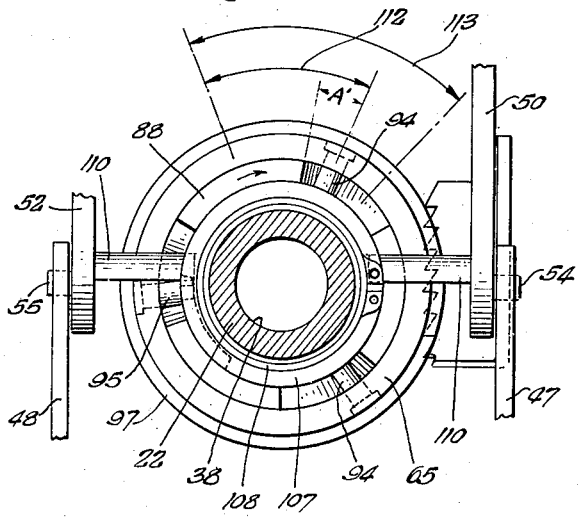
Figure 16:
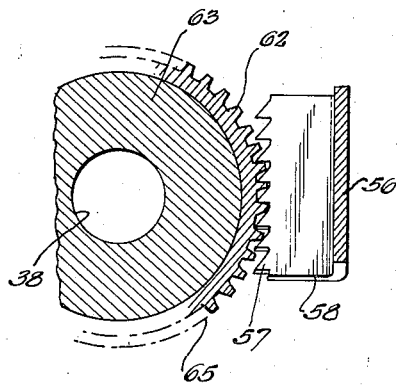

Figs. 5, 6, 7, 8 and 9 are end views of certain ones of the parts shown in Fig. 4 when those parts are viewed substantially as indicated by lines 5—5, 6—6, 7—7, 8—8 and 9—9, respectively, in Fig. 4 and in the directions indicated by the arrows;

Fig. 10 is a side view of the assembly of the chuck shown in Figs. 1 to 9, inclusive, with parts cut away at different positions to show details of the structure with the parts in one operating position;

Fig. 11 is a phantom side elevational view of the chuck assembly which depicts the parts in different operating positions from those illustrated in Fig. 10;

Figs. 12 and 13 are front end views of the illustrated chuck with parts cut away to illustrate certain details of structure and different operating positions of the parts;

Figs. 14 and 15 are rear end sectional views of the chuck wherein the views are taken substantially on lines 14—14 and 15—15 of Figs. 10 and 11, respectively, and viewed in the direction indicated by the arrows; and Fig. 16 is a fragmentary rear sectional view of a portion of my chuck and its actuating mechanism.

Although the structure and characteristics of my presently disclosed chuck are adapted to many and widely varied uses, I have illustrated it for exemplary purposes on a carriage plate adapted to use as a part of a valve grinding machine utilized in re-facing the valves of internal combustion engines and the like while such valves are removed from the engine.

Referring to the general structure depicted in Figs. 1 to 3, inclusive, a preferred embodiment of my chuck is designated generally by the reference numeral 20 and is mounted at one end of a hollow spindle, which spindle is journaled for rotation in and carried by a support 23. Desirably, the support 23 has an integral foot 24 through which fastening means, such as a bolt 25, extends to secure the support to a mounting, such as a carriage plate 26, and is hollowed out internally to provide a housing for a pulley 27, as shown in Fig. 3. The pulley 27 is mounted on the spindle 22 and drivingly connected thereto by means such as a set screw 28. In the present instance, the spindle is driven by driving force applied to the pulley 27 through a flexible belt 29.

At the end of the spindle 22, upon which the chuck 20 is mounted, a radial shoulder 30 on the outer surface of the spindle determines its axial position in one direction relative to the support, while at the other end I prefer to use a collar 32 which fits onto the spindle and is secured in place by means such as a set screw 33. I also prefer to provide a knob 34 on the end of the spindle 22 adjacent the collar 32 which is keyed to the spindle. A set screw 35 is threaded into the collar 34 and extends radially through an opening 36 and is utilized adjustably to locate an aligner 37 within the axial bore 38 of the hollow spindle.

The aligner 37 has a grip portion 39 which normally projects from the end of the spindle 22 opposite the chuck 20 and in its opposite or inner end has a conical bore 40 extending axially thereof, which conical bore is adapted to receive the ends of parts, such as the stems of valves 42, which are held by the chuck to center and stabilize those ends. The dimensions of the conical bore are such that they will accommodate the ends of parts which are within the size limit range of the chuck 20. Axial movement of the aligner 37 relative to the spindle 22 and the securing of the aligner in a set position by the tightening of the set screw 35 provide an adjustment for various lengths of parts which are held by the chuck and establish the extent of the projection of the other ends of such parts from the chuck. By preference, one side of the aligner is provided with a flat face 43 against which the end of the set screw 35 engages.

Although the gripping mechanism of my disclosed chuck is suited to various kinds of actuation such, for example, as magnetic, pneumatic or hydraulic, as well as to the use of actuating mechanisms suited to the desired circumstances of operation and kind of actuation, I have disclosed in the present instance a mechanical actuating mechanism adapted to control by a manually operable chuck-actuating lever 44. A bracket 45 is secured to the end of the support 23 adjacent the chuck 20 by fastening means, such as screws 46. On opposite sides and near the rear end of the chuck, the bracket 45 has arms 47 and 48 which extend upwardly and have holes, such as 49, in their upper ends. Legs 50 and 52 of a yoke 53 on the lower end of the chuck-actuating lever 44 fit between the arms 47 and 48 of the bracket and have studs 54 and 55 projecting from their outer surfaces which fit into the holes 49 of the bracket to provide a trunnion support for swinging movement of the chuck-actuating lever. In my preferred construction, the axis of support and swinging movement of the chuck-actuating lever are substantially aligned with and lateral to the axis of the spindle 22.

A pawl 56 having a series of teeth 57 along the inner edge of an arcuate flanged portion 58 is mounted on the side surface of the leg 50 on the yoke of the actuating lever and held in place by fastening means, such as screws 59, which desirably have compression springs 60 disposed between the screw heads and the pawl, which springs normally bias the teeth of the pawl to a position for engagement with a circumferential series of teeth 62 on the outer surface of the chuck and permit passage of the pawl teeth across the surfaces of the teeth on the chuck during movement of the pawl to a position of disengagement from the chuck. As will be more fully explained in conjunction with the details of construction of the gripping and operating parts of the disclosed embodiment of my chuck, it is operated to effect release of a gripped part, such as the valve 42, by forward swinging movement of the chuck-actuating lever 44 to positions such as those indicated at 44a and 44b in Fig. 1.

Referring more in detail to the gripping mechanism of my chuck which is disclosed in Figs. 3, 4, 5 and 10 to 13, inclusive, of the drawings, an enlarged end portion 63 on the spindle 22 serves as a chuck body and has an outer cylindrical surface 64 which fits within and supports a main chuck sleeve 65 for rotational and axial movement. In addition to providing an outer enclosure for the chuck-gripping and actuating mechanisms, it is the main chuck sleeve 65 which has disposed on its outer surface the circumferential series of teeth 62. At its outer end and in spaced and opposed relationship to an outer end surface 66 of the chuck body, the main chuck sleeve 65 has an end flange portion 67 which extends inwardly toward the axis of the spindle and has therein a central opening 68 comparable in size to the axial bore 38 in the spindle 22.

Equally spaced circumferentially of the inner surface of the end flange portion 67 of the main chuck sleeve and at equal distances radially from the axis of the spindle 22 are a plurality of sockets 69 opening endwise toward the end surface 66 of the chuck body. The number of such sockets is somewhat a matter of choice although more than two are necessary in order to effect better angular distribution of the gripping forces. In the presently disclosed embodiment of my invention, I have utilized three equally distributed sockets, as depicted in Figs. 3, 4 and 5.

In the end surface 66 of the chuck body 63, an equal number of similar sockets 70 face toward the end flange portion 67 of the main chuck sleeve and are preferably distributed in the same manner and at the same radius with respect to the spindle axis as the sockets 69. A plurality of similar gripping elements 72 each have ball-like end portions 73 at opposite ends thereof which fit into opposed pairs of the sockets 69 and 70. The gripping elements 72 are preferably machined in one piece and are substantially rigid with a cylindrical mid-portion 74 intermediate the ball-like end portions and desirably of a somewhat smaller diameter than the ball-like end portions. Adjacent the ball-like end portions 73, the connecting portion of each gripping element is preferably cut away to a smaller diameter than that of the cylindrical mid-portion 74, as indicated at 75 in Fig. 4, to permit greater freedom of angular movement of the gripping elements in the sockets 69 and 70.

It may be readily understood that the ball-like end portions of the gripping elements coact with the sockets 69 and 70 to provide universally movable joints between those gripping elements and the opposed portions of the chuck body and main chuck sleeve. The gripping elements 72 are so disposed in the respective sockets 69 and 70 of the main chuck sleeve and chuck body, respectively, that when those sockets are aligned in axially opposed relationship, the axes of the cylindrical portions of the gripping elements are substantially parallel to and equally spaced radially from the axis of the spindle 22. However, as the main chuck sleeve and the chuck body are turned relative to one another and at the same time moved axially relative to one another so as to keep the ball-like end portions of the gripping elements firmly engaged in the sockets 69 and 70, the relative angular positions of the gripping elements change and the distances of their cylindrical mid-portions from the axis of the spindle are equally varied. Since the distribution of the gripping elements is equal and symmetrical with respect to the axis of the spindle and since those gripping elements are of substantially equal length, their movements which are effected by relative movements of the main chuck sleeve and chuck body, are equal and symmetrical with respect to the spindle axis.

Although there is no set combination of dimensions or relative proportions of the parts of the chuck gripping mechanism, the length of the gripping elements and the radial spacing of the sockets 69 and 70 from the spindle axis are proportioned with relationship to the maximum size of the articles to be gripped by the chuck and so as to provide a reasonable wide range of sizes of articles, such as the stems of valves 42, which may be gripped by the gripping elements. The diameters of the gripping elements themselves are equal and such that they provide substantial longitudinal rigidity of the elements. In the present instance, the over-all length of my gripping elements is somewhat greater than the diameter of the circular center line of the sockets. With the combination of dimensions and proportions provided in the disclosed embodiment of my invention, the gripping action, as well as an indication of the range of sizes of parts which may be gripped, is illustrated in Figs. 10 to 13, inclusive.

The gripping force applied by the gripping elements to a gripped article is dependent upon the forces exerted for effecting the relative rotational and linear movements of the chuck body 63 and the main chuck sleeve 65 since such forces are transmitted directly to and through the gripping elements.

As has been previously mentioned, there are various ways in which the forces might be obtained for effecting the gripping action of the gripping elements. In the present instance, the chuck-actuating mechanism is mechanically operated and a combination of springs is utilized to accomplish the desired gripping forces as well as a wide range of movement of the gripping elements. That is, I have provided a relatively weak spring having a wide range of movement and against which the gripping elements are moved through the major portion of their separation to an open position. In addition, I have provided a series of relatively strong springs which have a short range of movement and which become effective when a part to be gripped is contacted by the gripping elements to apply a strong gripping force. In addition to providing the proper operation of the springs, my chuck-operating mechanism also keeps the relative rotational and axial movements of the main chuck sleeve and chuck body properly related and proportional so as to keep the ball-like end portions of the gripping elements firmly engaged in their respective sockets.

For effecting the aforementioned operation, my chuck-operating mechanism includes a pressure sleeve 76 mounted for sliding movement on a cylindrical portion 77 of the spindle adjacent the rear end of the chuck body 63. On the end adjacent the chuck body 63, the pressure sleeve 76 has an integral radial flange portion 78, on the rear radial surface of which, as shown in Figs. 4, 10 and 11, are circumferential series of ratchet teeth 79. Axially spaced rearwardly of the radial flange portion 78 is a circumferential channel 80, within which is disposed a coiled torsion spring 82, one end of which is anchored in an axial recess 83 in the flange portion 78 and the other end 84 of which is bent to project outwardly in a radial direction. The mid-portion 85 of the pressure sleeve is of a heavier section to define the end of the channel 80 opposite the radial flange portion 78 and has in its outer surface a diagonally disposed recess 86, which recess has radial and substantially parallel side walls. Beyond the end of the mid-portion 85 of the pressure sleeve opposite the radial flange portion 78 is a relatively short sleeve portion 87.

A cam sleeve 88 fits over the cylindrical mid-portion 85 of the pressure sleeve 76 and has on one end surface a circumferential series of ratchet teeth 89 adapted to coact with the teeth 79 on the flange portion 78 to prevent relative rotation between the cam sleeve 88 and the pressure sleeve 76 in one direction when those teeth are engaged. A slot 90 extends into the toothed end of the cam sleeve 88 to receive the radially projecting end 84 of the spring 82. Thus, one end of the spring 82 is anchored to the pressure sleeve 76, while the other end is anchored to the cam sleeve 88 so that the biasing force of the spring 82 tends to produce relative rotational movement between the pressure and cam sleeves.

The end of the cam sleeve 88 opposite the teeth 89 has therein a plurality of similar axially extending notches 92 which are equally spaced circumferentially of the cam sleeve and each of which has a diagonally disposed cam surface 93 and an axially extending surface. The diagonally disposed cam surfaces 93 are substantially similar and parallel and are so disposed relative to the diagonal recess 86 of the pressure sleeve that they are transversely related. That is, when one of the cam surfaces 93 overlies the diagonal recess 86, it extends transversely across the parallel side walls of that recess.

When the cam sleeve 88 is assembled upon the pressure sleeve 76 and those sleeves are assembled upon the spindle and within the main chuck sleeve 65, the spring 82 is tensioned and a plurality of cam follower pins 94 and 95 are mounted in countersunk radial bores at the rear edge portion of the main chuck sleeve and extend into the notches 92 of the cam sleeve so as to be engaged by the diagonally disposed surfaces 93 thereof. When thus assembled, a resilient snap ring 97 extending around the periphery of the main chuck sleeve 65 in a circumferential slot 98 crosses the slotted heads of the cam follower pins to hold them in place. One of the cam follower pins 95 has an end extension 99 which fits into and is slidable in the diagonal recess 86 of the pressure sleeve.

With the gripping elements 72 in the positions shown in Figs. 3 and 10 to 13, inclusive, and as viewed from the front of the chuck, it may be observed that clockwise movement of the main chuck sleeve 65 relative to the chuck body and rearward axial movement of the main chuck sleeve relative to the chuck body effect inward movement of the mid-portions of the gripping elements toward the spindle axis. The direction of the normal biasing force of the spring 82 is such that it tends to produce the aforementioned closing movement of the gripping elements. That is, it biases the cam sleeve 88 in a clockwise direction relative to the pressure sleeve 76 so that with the diagonal cam surfaces 93 disposed as shown, those cam surfaces act upon the cam follower pins 94 and 95 to effect movement of the main chuck sleeve in a direction relative to the chuck body for closing the gripping elements. The projection of the end extension 99 into the diagonal recess 86 of the pressure sleeve not only maintains the proper tension in the spring 82 but also keeps the parts in proper relative alignment with respect to the pressure sleeve as well as keeping the relative linear movement in proportion to the relative rotational movement of the parts so that the gripping elements are retained in their sockets.

Since it is desirable for the spring 82 to have a considerable range of movement in order to allow a correspondingly large range of movement of the gripping elements for gripping articles of various sizes, it is preferable that it should not be strong enough to require any considerable amount of effort to move the chuck from a closed or a gripping position to one in which the gripped article is released for removal. On the other hand, unless the spring 82 provides a sufficiently strong gripping force, it is necessary to supplement that spring by additional means having the force to produce the desired gripping effort. In the presently disclosed structure, I have provided a series of strong springs for providing a large gripping effort at the gripping elements. With my disclosed structure and arrangement of parts, the necessary distance of movement of the strong springs is very short and, consequently, a large mechanical advantage by way of leverage can be utilized for overcoming the strong force of the springs through the necessary short distance of movement.

As shown in Figs. 3, 4 and 6, a plurality of relatively heavy compression springs, such as 100, are mounted in a circumferentially and symmetrically displaced series of axial bores 102 in the rear end surface of the chuck body 63. The springs 100 normally project from their respective bores 102 and press against the front end surface of the radial flange portion 78 of the pressure sleeve to bias that sleeve axially away from the chuck body along the surface of the spindle.

In addition to the bores 102 in the rear end surface of the chuck body 63, I have also provided a plurality of equally spaced bores 103 in symmetrically disposed relationship to the bores 102. In each of the bores 103 is mounted a stop pin 104 which projects from the rear end surface of the chuck body and extends through an opening 105 in the radial flange portion 78 of the pressure sleeve 76. The radial displacement of the pins 104 from the axis of the spindle is such that those pins are axially aligned for abutment against an internal shoulder 106 (Fig. 9), inside the toothed end of the cam sleeve 88. The stop pins 104 are of equal length and that length is so chosen with respect to the axial position of the shoulder 106 that a small amount of axial movement of the pressure sleeve 76 relative to the spindle can take place against the biasing force of the springs 100 or as a result of the biasing force of the springs 100 while the ratchet teeth 79 and 89 are engaged. However, when the pressure sleeve 76 is moved axially toward the chuck body beyond the point of engagement of the stop pins 104 with the shoulder 106 of the cam sleeve, the ratchet teeth 79 and 89 are disengaged. During the return movement the springs 100 bias the ratchet teeth into engagement.

In order to effect the axial movement of the pressure sleeve relative to the spindle, I have provided an abutment washer 107 which fits onto the spindle adjacent the end of the sleeve portion 87 of the pressure sleeve. Endwise movement of the abutment washer 107 along the spindle and away from the pressure sleeve is prevented by a resilient snap ring 108 which is mounted in a peripheral groove 109 in the spindle. The opposed radial end surfaces of the mid-portion 85 of the pressure sleeve and the abutment washer 107 define a peripheral channel. As indicated in Figs. 10 and 11, the chuck-actuating lever 44 carries oppositely disposed cam lugs 110 which normally fit into diametrically opposite sides of the channel between the pressure sleeve and abutment washer. The cam lugs 110 are so shaped that they present substantially flat front and upper surfaces and a smoothly curved rear surface, which rear surface is eccentric with respect to the corner formed by the upper and front surfaces so that rotation thereof by operation of the chuck-actuating lever forces the pressure sleeve axially of the spindle away from the abutment washer, while the frictional force thereof holds the spindle against rotation during the relative turning movement of the main chuck sleeve. Fig. 10 shows the relative normal positions of the parts with the cam lugs 110 merely inserted between the pressure sleeve and abutment washer, while Fig. 11 indicates the positions of those parts with the cam lugs turned against the biasing force of the springs 100 and sufficiently to have effected separation of the ratchet teeth 79 and 89. Figs. 14 and 15 are end sectional views depicting the same relative positions of the parts as those shown in Figs. 10 and 11, respectively. In other words, Fig. 10 illustrates the chuck in its closed position without having any part held by the gripping elements. Figs. 12 and 13 are cut-away front end views of the chuck with the gripping elements in the positions depicted in Figs. 10 and 11, respectively.

Having reference to Figs. 10 to 16, inclusive, it is to be noted that the arcuately shaped pawl 56 which is carried by the chuck-actuating lever is so positioned on the actuating lever that it is considerably displaced from its position of initial engagement with the teeth 62 on the main chuck sleeve when it is in its normal released position. As a result of this displacement, the initial angular movement of the actuating lever (through an angle of between 30 degrees and 45 degrees in the presently disclosed embodiment) effects operative rotation of the cam lugs 110, but only brings the pawl 56 into contact with the teeth 62 without producing any relative rotation between the chuck body and main chuck sleeve. The purpose of that initial angular movement is to actuate the pressure sleeve 76 relative to the chuck body 63 against the biasing force of the heavy compression springs 100, and thereby to bring the stop pins 104 into contact with the shoulder 106 so that continued movement of the actuating lever immediately effects separation of the ratchet teeth 79 and 89.

As soon as the ratchet teeth 79 and 89 have separated during the opening movement of the actuating lever, the movement of the pawl 56 against the teeth 62 on the main chuck sleeve 65 actuates that main chuck sleeve against the biasing force of the spring 82. During such movement, the cam follower pins 94 and 95 drive the cam sleeve 88 by cam action along the cam surfaces 93 against the biasing force of the spring 82. The projecting end 99 of the pin 95 is guided by the diagonal recess 86 in the pressure sleeve to effect axial or endwise movement of the main chuck sleeve corresponding to its rotational movement. Thus, relative rotational movement is effected between the main chuck sleeve 65 and the chuck body 63, which relative rotational movement is accompanied by proportional axial movement, and the combination of which movements swings the gripping elements from closed to open positions while firmly retaining those gripping elements in their respective sockets.

During the reverse movement of the chuck-actuating lever which returns it from a chuck-opening position to a position in which the chuck has gripped a part or is closed, the main chuck sleeve 65 follows the return movement of the pawl 56 as a result of the biasing force of the spring 82 transmitted thereto through the cam surfaces 93 and the cam follower pins 94 and 95. During such return movement the projecting end 99 of the cam follower pin 95 is guided by the diagonal recess 86 to maintain the proper proportion of rotational and linear movements.

During the initial closing movement, the ratchet teeth 79 and 89 are separated by the action of the cam lugs 110. If, during the return movement, and before the pawl 56 has completely disengaged the teeth 62, the gripping elements 72 engage a part, such as the valve stem 42, further return movement of the main chuck sleeve 65 relative to the chuck body is arrested by such engagement of the gripping elements with an obstacle in their paths of movement. In this event, the compression springs 60 which bias the pawl 56 toward the teeth 62 give sufficiently to allow the pawl to ride over the teeth 62 and become completely separated therefrom. When the main chuck sleeve is thus stopped, the cam follower pins also stop the movement of the cam sleeve 88, but the torsion spring 82 forces the diagonally disposed surface 93 of cam sleeve 88 up against the pins 94 and 95 thus holding the main chuck sleeve 65 in position, and thereby holding the gripping members in contact with the gripped part until the cam lugs 110 have returned to a position such that the ratchet teeth 79 and 89 reengage and the heavy compression springs 110 become effective to exert axial pressure through the radial flange portion 78 of the pressure sleeve and the cam sleeve 88 to the cam follower pins 94 and 95. This axial pressure is divided by the cam surfaces 93 into rotational and axial components so that the force tends to produce the necessary axial and rotational movements of the main chuck sleeve which force the gripping elements 72 into tight gripping engagement against the gripped article.

Release of a gripped article is readily effected by producing the opening movement of the chuck by operation of the chuck-actuating lever 44 as has been explained. In each instance of operation the heavy compression springs are initially and first released by the action of the cam lugs 110, while the further opening movement of the gripping elements only necessitates the movement of the main chuck sleeve against the biasing force of the lighter spring 82. When an article is gripped, the gripping elements are brought into contact with the article by the action of the lighter spring 82, after which the heavy compression springs are released to effect the strong gripping force. The coacting ratchet teeth 79 and 89 on the pressure sleeve 76 and cam sleeve 88 serve to separate and segregate the actions of the light and heavy springs so that they each perform their desired function and so that the long range movement of opening the gripping elements is accomplished against the action of the lighter spring, while the heavier springs act linearly to produce the desired gripping force with the engaged teeth preventing relative rotation between the pressure and cam sleeves during the application of the linear force. It may be noted that the lighter spring exerts a torsional force between the pressure and cam sleeve which is translated into rotational and axial components by cam surfaces 93, diagonal recess 86 and the coacting cam follower pins 94 and 95. The compression springs 100 act linearly, but the force thereof is likewise divided into rotational and linear components.

Since the chuck body and main chuck sleeve are coaxial with respect to the axis of the spindle, and since the sockets which hold the gripping elements are also coaxial with the same axis, as well as equally and symmetrically distributed, and the gripping elements are symmetrically disposed, the resultant axial and rotational movements of the main chuck sleeve relative to the chuck body which produce the opening and closing movements of the gripping elements keep those gripping elements in symmetrical relationship relative to the axis and provide a self-centering gripping mechanism. When utilized in association with an aligner, such as 37, any cylindrical article is automatically centered by the chuck.

In addition to the foregoing factors relating to the operation and relationships of parts which occur during the use of the chuck, Figs. 14 and 15 depict certain relative movements of the parts which occur during the chuck operation. As viewed from the rear in Fig. 14, each of the cam follower pins 94 and 95 engages one of the diagonally disposed cam surfaces 93 of the cam sleeve near its outer end when the chuck is in the closed position illustrated in Fig. 10. The normal angular displacement of each cam follower pin from the axial side of its notch 92 is designated in Fig. 14 by the letter A. Having reference to Fig. 15, the rotational movement of the main chuck sleeve, which is produced by the action of the pawl 56 on the teeth 62 from a given starting point, is designated by an arrow 112. During that rotational movement of the main chuck sleeve, however, the cam follower pins 94 and 95 move linearly as well as rotationally about the spindle axis and thus, by cam action, turn the cam sleeve 88 through an angle designated by an arrow 113. During these relative movements of the main chuck sleeve and cam sleeve, the angular distance designated as A in Fig. 14 diminishes to that designated as A in Fig. 15. From these representations it may be observed that the rotational movement of the cam sleeve 88 against the biasing force of the spring 82 is greater than the rotational movement of the main chuck sleeve which is manually produced. This allows the torsion spring 82 to act through a greater distance in producing its required work.

From the foregoing description it may be readily appreciated that, in addition to providing a chuck which is self-centering, I have also produced chuck-gripping and actuating mechanisms which are not only capable of producing strong gripping force while permitting ease of manual actuation through only a short movement of an actuating element, but are also capable of quick operation for gripping articles within a wide range of sizes.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A chuck comprising, in combination, a hollow spindle having a chuck body at one end thereof and a central axis, an aligner mounted within and adjustable axially of the hollow spindle, said aligner having a conical surface in one end thereof concentric with said axis and opening toward the end of the spindle upon which the chuck body is disposed, said chuck body having three sockets in the end thereof equally spaced circumferentially and relative to said axis, a main chuck sleeve mounted for rotational and axial movement on said chuck body and having an outer end portion extending inwardly in a radial direction and opposed to said end of the chuck body, said end portion of the chuck sleeve having three sockets in the inner surface thereof equally spaced circumferentially and axially opposed to the sockets in the chuck body, three substantially rigid gripping elements having cylindrical mid-portions and ball-like ends, said ball-like ends fitting into and being disposed in said opposed sockets of the chuck body and chuck sleeve so that relative rotation and linear movement of the chuck sleeve and body symmetrically and similarly varies the positions of the gripping elements relative to said axis, means connecting said chuck body and sleeve for effecting proportional rotational and linear movements thereof, and means for biasing said sleeve in one direction relative to the chuck body to effect movement of the mid-portions of the gripping elements toward said axis.

2. A chuck comprising, in combination, a hollow spindle having a chuck body at one end thereof and a central axis, said chuck body having a plurality of sockets in the end thereof equally spaced circumferentially and relative to said axis, a main chuck sleeve mounted for rotational and axial movement on said chuck body and having an outer end portion extending inwardly in a radial direction and opposed to said end of the chuck body, said end portion of the chuck sleeve having a plurality of sockets in the inner surface thereof equally spaced circumferentially and axially opposed to the sockets in the chuck body, a plurality of substantially rigid gripping elements having cylindrical mid-portions and ball-like ends, said ball-like ends fitting into and being disposed in said opposed sockets of the chuck body and chuck sleeve so that relative rotation and linear movement of the chuck sleeve and body symmetrically and similarly varies the positions of the gripping elements relative to said axis, means connecting said chuck body and sleeve for effecting proportional rotational and linear movements thereof, and means for biasing said sleeve in one direction relative to the chuck body to effect movement of the mid-portions of the gripping elements toward said axis.

3. In a chuck, the combination comprising a chuck body having a cylindrical outer surface concentric with respect to a central axis, the end of said chuck body having therein a number of sockets greater than two which are equally spaced from said central axis and circumferentially, a chuck sleeve having a cylindrical inner surface fitted onto the cylindrical surface of the chuck body for rotational and axial movement relative thereto, said chuck sleeve having an end portion extending inwardly in a radial direction and opposed to said end of the chuck body, said end portion of the chuck sleeve having in its inner surface a number of sockets equal to that in the end of the chuck body and in the same spaced relationship relative to one another and said central axis as those in the chuck body, gripping elements having ball-like ends mounted in the sockets in the chuck body and sleeve and in positions such that they are axially aligned when the sockets are in one position of opposed alignment, and means for effecting simultaneous relative, rotational and linear movements of the sleeve and chuck body to vary the relative angular positions of said gripping elements while maintaining the said ball-like ends seated in their respective sockets.

4. In a chuck as defined in claim 3, the combination being further characterized by the inclusion in the last mentioned means of a cylindrical member coaxially disposed relative to the cylindrical surface of the chuck body, said member having in its outer surface a guide slot extending circumferentially and axially of said surface and having substantially parallel side edges, and guide means secured to said chuck sleeve and having a portion disposed in said guide slot between the side edges thereof for controlling the relationship of the linear movement of the chuck sleeve relative to the chuck body corresponding to relative rotational movement therebetween.

5. In a chuck as defined in claim 3, the combination including resilient means normally biasing said sleeve in one direction rotationally relative to the chuck body, and a second resilient means effective during limited relative movement of the sleeve and chuck body for supplementing the first mentioned resilient means during a limited portion of said relative movement.

6. In a chuck, the combination comprising two coaxially disposed parts having portions presenting opposed surfaces spaced apart and disposed laterally of a central axis, means supporting said parts for movement relative to one another rotationally about and linearly along said axis, said portions of the parts each having therein a plurality of sockets equidistantly spaced radially and circumferentially relative to said axis, said sockets opening through said opposed surfaces, a number of substantially rigid gripping elements equal to the number of sockets in one of said parts, said gripping elements each having ball-like end portions at both ends and of a size to fit movably into said sockets, and said gripping elements being mounted between said parts in symmetrical relationship with their ball-like ends in said sockets, whereby simultaneous rotational and linear movements of the parts relative to one another varies the angular positions of the gripping elements and thereby changes the distances of the mid-portions of the gripping elements from said axis.

7. In a chuck as defined in claim 6, said gripping elements being of substantially equal length and having mid-portions of substantially equal diameter, and said mid-portions of the gripping elements being of smaller diameter than the diameter of the ball-like end portions.

8. In a chuck as defined in claim 6, the combination being further characterized by the inclusion of means connecting said coaxially disposed parts for keeping the direction and amount of relative linear movement therebetween in proportion and directional relationship to the relative rotational movement.

9. In a chuck as defined in claim 6, the combination being further characterized by the inclusion of stop means for defining limits of relative movement of the coaxially disposed parts, and means for biasing said parts toward one of said limits.

10. In a chuck, the combination comprising a plurality of gripping elements symmetrically disposed with respect to a central axis, and means for movably supporting said gripping elements at their opposite ends, each of said gripping elements having a ball-like end portion at each of its ends and a cylindrical mid-portion of smaller diameter than the ball-like end portions.

11. In a quick opening chuck for gripping articles of various sizes, the combination comprising two coaxially disposed parts in juxtaposed relationship and having axial openings at adjacent ends for the insertion of said articles, said parts being supported for manually effected relative rotational movement about their common axis, a plurality of gripping elements supported in said parts adjacent said openings for movement toward and from the axis of the parts in response to relative rotational movement of the parts, and a mechanism through which said parts are mechanically interconnected, said mechanism being responsive to contact of said gripping elements with an article for controlling the force applied to the article by the gripping elements.

12. In a quick opening chuck as defined in claim 11, said mechanism including a relatively weak spring biasing said parts for relative rotation in one direction, a relatively strong spring for action upon said gripping elements after the gripping elements have been brought into contact with an article, and means for restraining the strong spring while relative movement of the parts is effected by the weak spring.

13. In a quick opening chuck as defined in claim 11, said mechanism including a third movable part interposed between and drivingly connecting said two movable parts.

14. In a chuck, the combination comprising two coaxially disposed parts having portions in opposed and axially spaced relationship, a plurality of substantially rigid gripping elements, said parts and gripping elements being provided with coacting means for movably supporting said gripping elements at opposite ends between said opposed and axially spaced portions of the parts and in symmetrically and equally spaced relationship relative to the axis of the parts, said gripping elements being angularly disposed relative to said axis and to one another so that axial movement of the parts toward one another and relative rotational movement of the parts similarly varies the positions of the gripping elements relative to the axis and to one another, means for maintaining the variations of relative rotational and axial positions of asid parts in accordance with a defined relationship, and manually operable means for holding one of the parts and moving the other to actuate the gripping elements.

15. In a chuck, the combination comprising two coaxially disposed parts having portions in opposed and axially spaced relationship, a plurality of substantially rigid gripping elements, said parts and gripping elements being provided with coacting means for movably supporting said gripping elements at opposite ends between said opposed and axially spaced portions of the parts and in symmetrically and equally spaced relationship relative to the axis of the parts, said gripping elements being angularly disposed relative to said axis and to one another so that axial movement of the parts toward one another and relative rotational movement of the parts similarly varies the positions of the gripping elements relative to the axis and to one another, means for maintaining the variations of relative rotational and axial positions of said parts in accordance with a defined relationship, means for biasing said parts toward positions such that said gripping elements approach said axis, and manually operable means for moving said parts relatively against the biasing force of the biasing means.

16. In a chuck, the combination comprising two coaxially disposed parts having portions in opposed and axially spaced relationship, a plurality of substantially rigid gripping elements, said parts and gripping elements being provided with coacting means for movably supporting said gripping elements at opposite ends between said opposed and axially spaced portions of the parts and in symmetrically and equally spaced relationship relative to the axis of the parts, said gripping elements being angularly disposed relative to said axis and to one another so that axial movement of the parts toward one another and relative rotational movement of the parts similarly varies the positions of the gripping elements relative to the axis and to one another, a torsion spring having a relatively wide range of movement for normally biasing said parts rotationally in one direction relative to one another, compression spring means having a relatively short range of movement for biasing said parts in one direction, and means for controlling the operation of the compression spring means so that it is effective only at the limit of movement of the torsion spring in the direction of the biasing force thereof.

17. In a chuck, the combination comprising two coaxially disposed parts having portions in opposed and axially spaced relationship, a plurality of substantially rigid gripping elements, said parts and gripping elements being provided with coacting means for movably supporting said gripping elements at opposite ends between said opposed and axially spaced portions of the parts and in symmetrically and equally spaced relationship relative to the axis of the parts, said gripping elements being angularly disposed relative to said axis and to one another so that axial movement of the parts toward one another and relative rotational movement of the parts similarly varies the positions of the gripping elements relative to the axis and to one another, a hollow support coaxial with said parts, and centering means within said hollow support and spaced axially from said gripping elements.

JENS AXEL W. MADSEN.

REFERENCES CITED

The following references are of record in the file of this patent:

UNITED STATES PATENTS

| Number | Name | Date |
| --- | --- | --- |
| 2,163,028 | Faster | June 20, 1939 |

FOREIGN PATENTS

| Number | Country | Date |
| --- | --- | --- |
| 120,761 | Germany | June 14, 1901 |